United States Patent [19]

Vidal et al.

[11] 4,350,709

[45] Sep. 21, 1982

[54] GASEOUS ANTI-MICROBIAL TREATMENTS OF STORAGE GRAIN

[75] Inventors: Frederick D. Vidal, Englewood Cliffs; Anantharaman Jayaraman, Nutley, both of N.J.

[73] Assignee: Pennwalt Corporation, Philadelphia, Pa.

[21] Appl. No.: 163,410

[22] Filed: Jun. 26, 1980

Related U.S. Application Data

[60] Continuation-in-part of Ser. No. 156,501, Jun. 4, 1980, Pat. No. 4,309,451, which is a division of Ser. No. 50,162, Jun. 20, 1979, abandoned, and a continuation-in-part of Ser. No. 38,739, May 14, 1979, abandoned.

[51] Int. Cl.$^3$ ............... A23B 9/00; A23L 3/34
[52] U.S. Cl. ............... 426/319; 426/320; 426/331; 426/335; 426/532; 422/28; 424/164
[58] Field of Search ............ 426/321, 331, 335, 312, 426/319, 320, 532, 442, 618, 474, 259; 424/317, 161, 162, 164, 166, 175, 127, 149, 298, 315, 343; 422/28

[56] References Cited

U.S. PATENT DOCUMENTS

| | | | |
|---|---|---|---|
| 1,222,830 | 4/1917 | Werner | 426/626 |
| 1,524,494 | 1/1925 | Warth | 424/162 |
| 1,777,044 | 9/1930 | Legendre | 426/319 |
| 2,132,786 | 10/1938 | Hockenyos | 424/162 |
| 3,404,987 | 10/1968 | Kooistra et al. | 426/9 |
| 3,608,085 | 9/1971 | Papworth | 426/331 |
| 3,928,577 | 12/1975 | Kochurova et al. | 426/335 |
| 3,962,475 | 6/1976 | Forest et al. | 426/331 |
| 4,083,999 | 4/1978 | Drury et al. | 424/317 |
| 4,208,443 | 6/1980 | Kanuch et al. | 426/331 |

OTHER PUBLICATIONS

Hawley, Gessner G.; *The Condensed Chemical Dictionary*, 9th Ed., Van Nostrand Reinhold Co., N.Y., ©1977, pp. 374, 725 and 827.
Kirk-Othmer; *Encyclopedia of Chemical Technology*, 3rd Ed., vol. 11, John Wiley & Sons, N.Y.; ©1980, p. 256.
Furia, Thomas E.; *Handbook of Food Additives*, The Chemical Rubber Co., Cleveland, ©1968, pp. 159–172.
Chemical Abstracts, vol. 87, N. 19, p. 451, Nov. 1977, Abst. No. 150449p.
Chemical Abstracts, vol. 66, 1967, Abst. No. 27779k.
Foods, vol. 72, p. 293, 1970, Abstract No. 2303m.
Thermodynamics, vol. 88, p. 427, 1976, Abst. No. 137947x.
Chemical Abstracts, vol. 76, p. 329, 1972, Abst. No. 50552w.
Air Pollution & Industrial Hygiene, vol. 75, p. 167, 1971, Abst. No. 100985s.
Chemical Abstracts, vol. 53, 1959, Columns 22770-22771.
Chertkov, B. A., *Zhur. Priklad. Khim.*, 32, pp. 1732-1742, 1959.
Catalysis, Kinetics, vol. 78, p. 309, 1973, Abst. No. 20686s.
Chemical Abstracts, vol. 83, p. 600, 1976, Abst. No. 187726v.
Mizoguchi, T. et al.; *Bulletin of the Chemical Society of Japan*, vol. 49, No. 1, 1976, pp. 70-75.
Chertkov, B. A. et al.; *Soviet Chemical Industry*, vol. 49, No. 6, 1973, pp. 383-387.
Kirk-Othmer, *Encyclopedia of Chemical Technology*, 2nd Ed.; pp. 90-91.
M. Goehring, Ergebnisse and Probleme der Chemie der Schwefelstickstoffverbindungen, Akademie Verlag, Berlin, 1957, pp. 138-141.
Handbook of Chemical & Phys., 46 Ed., (1965), pp. D-105, 106 and 107.
Nickless (Ed.), Inorganic Sulfur Chemistry (1968), p. 377, pp. 515-517.

*Primary Examiner*—Thomas G. Wiseman
*Assistant Examiner*—Elizabeth J. Curtin
*Attorney, Agent, or Firm*—Woodcock, Washburn, Kurtz, Mackiewicz & Norris

[57] ABSTRACT

Novel sequential gas treatments for preserving grain are disclosed. Sulfur dioxide gas which has been bubbled through an organic acid, such as propionic acid, is perfused through grain to be treated and permitted to react with that grain for a preselected period of time, to produce a preserved grain product. This grain product is then preferably perfused with ammonia gas. Alternatively, residual sulfur dioxide may be dispersed within the treated grain mass through the introduction of a carrier gas prior to ammonia gas perfusion. Other preservative methods and substances are also disclosed which provide superior preserved grain products.

5 Claims, No Drawings

GASEOUS ANTI-MICROBIAL TREATMENTS OF STORAGE GRAIN

CROSS REFERENCE TO RELATED APPLICATIONS

The present application is a continuation-in-part of our prior co-pending patent application entitled "Liquid AntiMicrobial Treatment for Storage Grain", Ser. No. 156,501, filed June 4, 1980, now U.S. Pat. No. 4,309,451, which is a division of my prior copending application Ser. No. 050,162, filed June 20, 1979, now abandoned, which applications are hereby incorporated by reference as if fully set forth herein.

The present application is also a continuation-in-part of our prior co-pending patent application entitled "Gaseous Antimicrobial Treatment of Storage Grains", Ser. No. 06/038,739, filed May 14, 1979, now abandoned, which application is hereby incorporated by reference as if fully set forth herein.

The present application is also related to our copending patent application entitled "Liquid Antimicrobial Treatment for Storage Grain", Ser. No. 163,413, filed June 26, 1980, which is a continuation-in-part of the above-mentioned division, and which application is hereby incorporated by reference as if fully set forth herein.

BACKGROUND OF THE INVENTION

The present invention relates to the field of preservative treatments of grains during storage, and more particularly, to treatments applied to grains containing more than about 15% moisture, to prevent microbial spoilage which might otherwise result, as for example due to the growth of various fungi, molds, etc.

It is often advantageous to store grains such as corn, wheat, sorghum and the like after harvest and prior to their eventual conversion into products such as flour, molasses, etc. Unfortunately, without some form of treatment after harvest, most grain will spoil, particularly when stored in semi-closed conditions, such as grain storage bins, elevators, etc. After harvest, most grain contains approximately 20% to 25% moisture. This moisture content is sufficient to promote microbial growth, such as fungi and mold growth, which may very rapidly cause spoilage of the stored grain.

One treatment for preserving grain during storage which has achieved considerable success is the rapid drying of grain through the application of heat, such as hot air, which reduces the moisture content of that grain to below about 15%. At this moisture content, grain may be stored for extended periods of time while retaining suitable odor, flavor, and color characteristics. Unfortunately, this technique normally requires the consumption of substantial amounts of energy which is used to provide the heat necessary for quick drying of grain to be preserved in this manner. Accordingly, a substantial need has arisen for alternative preservative treatments which may be used either alone or in combination with ambient air drying techniques, to thereby provide an energy efficient method of treating grain for storage.

Another treatment for preserving grain which has achieved some commercial success is the use of propionic acid. This treatment normally entails the provision of less than 2%, usually about 1%, by weight of propionic acid to the grain to be treated. While this method is effective for inhibiting microbial growth, grain treated with these amounts of propionic acid has an objectionable taste and color, and therefore may not be sold for human consumption. Nonetheless, under E.P.A. regulations, grain containing not more than 2% propionic acid can be sold for animal fodder. It is estimated that propionic acid treatment is not used on more than about 1% of the grains stored in the United States.

It has also been suggested to treat grains during storage with various gases. According to one process, ammonia gas is slowly "trickled" through grain to be treated. Unfortunately, this treatment discolors the treated grain, producing a darkened product. Accordingly, grain treated with an ammonia gas trickle process is permitted only for animal consumption.

Another gas which has been suggested for use in preserving grains is sulfur dioxide. Not surprisingly, sulfur dioxide gas, while exhibiting preservative effects, may produce some odor and flavor problems in the treated grain. Additionally, treatments with sulfur dioxide gas are extremely corrosive on storage equipment, presumably as the result of sulfurous and sulfuric acids which are formed within the moist treatment environment.

The above described treatments, and other chemical materials, have been described in various publications as exhibiting preservative or pesticidal effects:

For various patents referring to the use of gases, such as ammonia gas or sulfur dioxide gas, please see U.S. Pat. No. 1,777,044 (Legendre) (Grain preserved through treatment with ammonia gas, sodium carbonate or alkaline-reacting gas by adjusting the hydrogen ion concentration of the adherent moisture to a point within the range pH 7–10.); U.S. Pat. No. 3,928,577 (Kochurova et al) (vegetable food products, flower bulbs, plants, etc. preserved with tablets containing potassium metabisulfite, gelatin or starch, stearic acid and salts thereof which are described as replacing use of sulfur dioxide, potassium metabisulfite, sulfurous acid and sodium bisulfite prior art techniques); U.S. Pat. No. 1,524,494 (Warth) (sulfur dioxide or other gases such as hydrocyanic acid gas, carbonic acid gas, and chlorine disclosed as treatments for composition cork to destroy or prevent the development of mold spores, bacteria, fungus growths, yeasts, insect larvae, etc.); U.S. Pat. No. 2,132,786 (Hockenyos) (sulfur dioxide intermixed with carbon dioxide for use as fumigant for carpet beetles, moths, bedbugs, etc.); U.S. Pat. No. 2,912,793 (Stone et al) (soil treatment to reduce nematode populations comprising injection of sulfur dioxide substantially below the surface of the soil followed by a soil pH adjustment by application of an alkaline fertilizer, such as anhydrous ammonia, calcium oxide, etc.).

Organic acids, such as decanoic, undecylenic, and acetic acids, have also been suggested in the literature as treatments for storage grains:

In U.S. Pat. No. 3,962,475 a method is disclosed for preserving high moisture content agricultural grains comprising treating grains with, (1) a composition consisting essentially of an organic food-grade acid or phosphoric acid, (2) a water soluble, noncorrosive, nontoxic, alkali or alkaline earth metal sulfate salt, and (3) a synthetic organic cationic or anionic surfactant for enhancing the penetration of said acid into said grains. In accordance with this disclosure, exemplary organic acids include propionic and acetic acids, while exemplary alkali or alkaline earth metal sulfate salts particularly include such sulfate salts as sodium and potassium sulfates.

In U.S. Pat. No. 3,404,987 (Kooistra et al), a preserving agent, such as propionic acid, sorbic acid, benzoic acid (and its methyl and ethyl esters) and a potentiating agent, typically an edible mineral salt, such as the phosphates, carbonates, chlorides, nitrates, sulfites, pyrophosphates and hydroxides of iron, manganese, zinc, tin and silver, are disclosed as being effective in inhibiting microbial growth in food systems. In this patent, the cooperative effect between the preserving agent and potentiating agent is described as exhibiting outstanding activity against microorganisms.

Another chemical which has been reported in the literature as exhibiting a preservative effect is ammonium bisulfite. In *Chemical Abstracts*, Vol. 87, No. 19, p. 451 (1977) preservation with 0.4% ammonium bisulfite ($NH_4HSO_3$) of oat-pea, corn, clover-timothy, or alfalfa silage containing 72-84.6% water was described as improving feed quality. Preservation was described as increasing the soluble sugar, nitrogen and lactic acid content of the feeds and of preventing butyric acid formation. Good results were also reported by mixing corn with straw (5:1, 67.3% moisture) and treating the mixture with 0.4% ammonium bisulfite. Similarly, in *Chemical Abstracts*, Vol 66, No. 7, p. 2616 (1967) (Abstract 27779K) selected preservatives were tested to determine the pH of a 1% solution, acidity or buffer value, and the preserving properties of selected preservatives. The preserving capacity was determined by the degree of suppression of germination of moist grain, the growth of mold, the activities of oxidative-reductive, proteolytic, and amylolytic enzymes. Thiourea, ammonium bisulfite ($NH_4HSO_3$), a mixture of urea and $NH_4$ pyrosulfate, and ammonium bisulfate ($NH_4HSO_4$) were described as good preservatives which enriched green matter with nitrogen and sulfur. Other ammonia containing compounds were described as weak preservatives. Of these compounds, ammonium bisulfite, ammonium bisulfate, and ammonium chloride ($NH_4Cl$) were recommended for further study and industrial tests. Finally, in *Chemical Abstracts*, Vol. 72, No. 1 (1970), p. 203 (Abstract No. 2303m) various sulfur preparations were described as preserving green fodder. Among these, liquid sulfur dioxide, $NaHS_2O_3$ and an 80% solution of $NH_4SO_3$ were tested at given doses. Upon comparison with "conventional methods", strong decomposition of all soluble carbohydrates was inhibited, the latent phase of fermentation was prolonged, total traceable acidity was decreased, and the formation of volatile and non-volatile organic acids was suppressed. The resultant silage was considered to be superior to conventional silages in organoleptic properties, as well as in maintenance of its structure. Preservation with sulfur preparations was described as reducing the loss of nutritive substances by 50%.

It is known to commercially prepare ammonium bisulfite by bubbling ammonia and sulfur dioxide into water, forming an essentially 100% yield of pure ammonium bisulfite solution having a pH of about 5.5. Aqueous solutions of 47-50 weight percent of ammonium bisulfite are thus readily available. Upon extended storage, particularly when exposed to air, ammonium bisulfite is known to spontaneously undergo various "disproportionation" reactions. For various discussions of these disproportionation reactions, their kinetics, and the products which result therefrom, please refer to the following articles, each of which are hereby incorporated by reference:

Landrooth et al, Thermodynamics, Vol. 88, 1976, p. 427, "Thermodynamics of the reaction of ammonia and sulfur dioxide in the presence of water vapor";

Zelionkaite et al, Chemical Abstracts, Vol. 76, 1972, p. 329, "Decomposition of Ammonium hydrosulfite solutions under the action of thiosulfate";

Scargill, Air Pollution and Industrial Hygiene, Vol. 75, 1971, p. 167, "Dissociation constants of anhydrous ammonium sulfite and ammonium pyrosulfite prepared by gas phase reactions";

Chertkov, Chemical Abstracts, Vol. 53, 1959, Cols. 22770-22771, (citing Zhur. Priklad. Khim. 32, 1695-1707, 1959), "Kinetics of the autodecomposition of ammonium bisulfite-sulfite solutions";

Chertkov, Zhur. Priklad. Khim. 32, 1732-1742, 1959, "Kinetics of Spontaneous Decomposition of Ammonium Sulfite-Bisulfite Solutions";

Najbar et al, Catalyst, Kinetics, Vol. 78, 1973, p. 309, "Kinetics and stoichiometry of the heterophase reaction sulfur dioxide with ammonia";

Hisatsune, Chemical Abstracts, Vol. 83, 1976, p. 600, "Infrared spectroscopic study of the ammonia-sulfur dioxide-water solid state system";

Mizoguchi et al, Bulletin of the Chemical Society of Japan, Vol. 49(1), 1976, pp. 70-75, "The Chemical Behavior of Low Valence Sulfur Compounds. $X^1$) Disproportionation of Thiosulfate, Trithionate, Tetrathionate and Sulfite under Acidic Conditions";

Chertkov et al, Soviet Chemical Industry (English Translation), Vol. 49(6), 1973, pp. 383-387, "Spontaneous Decomposition of Concentrated Ammonium Sulfite—Bisulfite Solutions";

Encyclopedia of Chemical Technology, Vol. 14, pp. 90-91, edited by Raymond E. Kirk and Donald F. Othmer, published by The Interscience Encyclopedia, Inc., New York, "Thionic Acids";

Goehring et al, Zeitschrift fuer anorganische and allgemeine Chemie, Vol. 263, 1950, pp. 138-144, "Ueber die Einwirkung von Schwefeldioxyd auf Ammoniak";

M. Goehring, Ergebnisse and Probleme der Chemie der Schwefelstickstoffverbindungen, Akademie Verlag, Berlin, 1957.

These "disproportionation" reactions apparently cause ammonium bisulfite to be oxidized and disproportionated into several other compounds, which contribute to a solution exhibiting a lowered pH. Analysis of ammonium bisulfite which had aged for several years indicated that the aged compound contained considerable amounts of ammonium bisulfate, and minor amounts of thiosulfate, metabisulfite, dithionate, imidodisulfonate, and various polythionates. In addition to a lowered pH, a disproportionated solution of ammonium bisulfite exhibits a yellow-greenish color which is not exhibited by a "fresh" (undisproportionated) aqueous solution of ammonium bisulfite.

As seen from the above, while many efforts have been made to provide preservatives which are suitable for use in preserving grains, no chemical preservative has yet been found which provides an efficient, low cost method of preserving grains, while maintaining or enhancing the color, odor and flavor characteristics of those grains so that the treated grains remain suitable for human consumption.

SUMMARY OF THE INVENTION

The present invention provides novel sequential gaseous treatments for preserving grain. In accordance with the preferred embodiment of the present invention, sulfur dioxide gas which may have been bubbled through an organic acid or ester, such as propionic acid, is perfused through grain to be treated and permitted to react with that grain for a preselected period of time, to produce an intermediate grain product. This intermediate grain product is then preferred with ammonia gas to produce a preserved grain exhibiting long-term resistance to spoilage. In alternate embodiments of the present invention, complete perfusion of sulfur dioxide into the treated grain mass is accomplished through the introduction of a carrier gas, such as air, or nitrogen, prior to ammonia gas perfusion. In still other embodiments, sulfur dioxide gas which has been bubbled through an organic acid, ester or alcohol, to thereby acquire "vapor pressure" amounts of those substances, is introduced into the grain mass to effect a complete preservative treatment. In each instance, the disclosed methods provide preserved grain products which are superior to products resulting from treatments of either sulfur dioxide gas or ammonia gas.

Grain treated in accordance with the preferred embodiments of the present invention is not discolored and it does not exhibit adverse odor or flavor characteristics. When corn is treated with the preferred embodiment techniques, its color may be improved.

The methods of the present invention provide treatments for preserving grains which are less corrosive on associated grain storage equipment than prior art treatments with either propionic acid or sulfur dioxide alone. Since these treatments are effective against *A. flavus*, they are believed to also be suited to the treatment of peanuts to control *A. flavus* associated aflatoxin concentrations.

Accordingly, a primary object of the present invention is the provision of novel grain preservatives.

Another object of the present invention is the provision of grain preservative methods which do not adversely affect the color, taste or odor of the grains treated therewith.

A further object of the present invention is the provision of preserved grain which is suitable for human consumption.

Still another object of the present invention is the provision of peanuts which have been treated to prevent the growth of *A. flavus* and the formation of aflatoxin.

These and other objects of the present invention will become apparent from the following more detailed description.

DESCRIPTION OF THE PREFERRED EMBODIMENTS

While particular examples have been selected for the purposes of illustration, one of ordinary skill in the art will recognize from the information set forth herein that the materials and methods of the present invention are applicable to a wide variety of grains and a wide variety of treatment parameters which may be adjusted depending upon the particular storage conditions of the grain to be treated. Accordingly, one of ordinary skill in the art will recognize that various modifications may be made to specific materials and concentrations described hereinafter without departing from the scope of the present invention, which is defined more particularly in the appended claims.

In the preferred embodiment of the present invention, high moisture content (15–30+% $H_2O$) grains are protected against microbial spoilage through synergistic use of sulfur dioxide, lower aliphatic acids or esters, and ammonia. In accordance with this method, liquid, fatty acids or esters are placed in a container through which sulfur dioxide is bubbled, to thereby collect vapor pressure amounts of said fatty acids or esters in said sulfur dioxide gas. In accordance with this embodiment, 100 to 600 parts per million of sulfur dioxide and 10–200 parts per million of the lower aliphatic fatty acids or esters are applied to the grain to be treated. As used herein, the term "lower aliphatic acid" refers to formic, acetic, propionic, butyric, and pentanoic acids, and their isomers. As used herein, the term "lower aliphatic esters" refers to methyl, ethyl, propyl, and butyl esters (and their isomers) of the aforementioned lower aliphatic fatty acids, as well as esters of such dicarboxylic acids as succinic, fumaric, and malonic acids. It is also within the scope of the present invention to utilize alcohols having fewer than 10 carbon atoms, particularly ethanol, propanol, and isopropanol, in place of the above mentioned fatty acids or esters. In each instance, the fatty acids, esters or alcohols contained within the sulfur dioxide gas are believed to catalyze reactions between sulfur dioxide and the grain to be treated therewith, and/or to aid in the penetration of sulfur dioxide gas into the grain kernels. Following the sulfur dioxide gas treatment step, ammonia gas is perfused through the treated grain mass to produce a preserved grain product.

In accordance with the preferred embodiments of the present invention, the aforementioned lower aliphatic fatty acids, alcohols, and esters are utilized at room temperature when brought into contact with sulfur dioxide gas. In this manner, "vapor pressure" amounts of these materials may be introduced into the sulfur dioxide gas stream. It is within the scope of the present invention, however, to adjust the amounts of vapor introduced into the sulfur dioxide gas stream by heating or cooling the subject liquids until preferred amounts of vapor are included with the sulfur dioxide treatment stream.

In order to demonstrate the efficacy of the above-described method, 200 grams of freshly harvested corn samples having a moisture content of about 28% and various internal mold contents were placed in 500 ml round bottom flasks. About 100 ml of air were syringed out of each of these flasks. Five milliliters of the subject ester or fatty acid were then placed in a "cold finger" condenser. Air or sulfur dioxide was bubbled through the system until it was saturated at the given test temperature. Required amounts of air or sulfur dioxide saturated with the corresponding ester or fatty acid were then collected in a syringe as the gases emerged from the above described saturation system. The collected sulfur dioxide or air was then injected into the corn contained in the above-mentioned flask. After 15 minutes of mixing, a similar volume of ammonia gas was injected into the corn. Samples were plated immediately by the whole kernel method to determine the initial internal molds after the treatment. Remaining samples were transferred to glass columns and approximately 1 to 2 cubic feet per minute per bushel of ambient air was permitted to blow through the columns of corn. After the samples reached a safe moisture level (below about 14%), they were once again whole kernel plated to determine the percent of internally infected kernels after ambient air drying. It was estimated that the various fatty acid or ester contents of the treated grain varied between 10–50 parts per million according to the amounts of gas utilized. In this test, the given corn samples originated from Indiana and New Jersey. The results of the above-described technique are summarized in Tables I and II:

TABLE I

Synergism Between Various Esters* and $SO_2$

| Examples | Treatments/200 g Corn | % Kernels Showing Internal Mold | |
|---|---|---|---|
| | | Before Amb. Air Drying | After Amb. Air Drying |
| 1 | 50 ml air (Control)** | 90 | 84 |
| 2 | 25 ml $SO_2$ - No Ester | 66 | 4 |
| 3 | 25 ml $SO_2$ - Ethyl Acetate | 12 | 2 |
| 4 | 25 ml $SO_2$ - Isopropyl Acetate | 10 | 2 |
| 5 | 25 ml $SO_2$ - Ethyl Succinate | 10 | 0 |
| 6 | 25 ml $SO_2$ - Ethyl Laurate | 18 | 4 |
| 7 | 25 ml $SO_2$ - Ethyl Myristate | 6 | 2 |
| 8 | 25 ml $SO_2$ - Ethyl Malonate | 35 | 20 |

*In these experiments the esters were kept at room temperature.
**Similar results were obtained when air was bubbled through the corresponding esters.

TABLE II

Synergism Between Lower Aliphatic Fatty Acids* and $SO_2$

| | | % Kernels Showing Internal Mold | | | | | |
|---|---|---|---|---|---|---|---|
| | | Before Amb. Air Drying | | | After Amb. Air Drying | | |
| Example | Treatments/200 g Corn | Sample I | Sample II | Sample III | Sample I | Sample II | Sample III |
| 9 | 50 ml Air (Control) | 56 | 42 | 20 | 62 | 86 | 82 |
| 10 | 50 ml $SO_2$ | 2 | 0 | 4 | 0 | 2 | 0 |
| 11 | 30 ml $SO_2$ | 22 | 18 | 8 | 14 | 16 | 0 |
| 12 | 20 ml $SO_2$ | 42 | 20 | 16 | 18 | 16 | 0 |
| 13 | 10 ml $SO_2$ | 36 | 40 | 18 | 18 | 32 | 10 |
| 14 | 50 ml Air + Propionic Acid | 58 | 38 | 28 | 68 | 88 | 88 |
| 15 | 30 ml $SO_2$ + Propionic Acid | 2 | 2 | 2 | 0 | 0 | 0 |
| 16 | 20 ml $SO_2$ + Propionic Acid | 4 | 6 | 8 | 2 | 0 | 0 |
| 17 | 10 ml $SO_2$ + Propionic Acid | 12 | 6 | 10 | 16 | 2 | 2 |
| 18 | 50 ml Air + Acetic Acid | | 74 | | | 56 | |
| 19 | 30 ml $SO_2$ + Acetic Acid | | 26 | | | 8 | |
| 20 | 50 ml Air + Acetic Acid + Propionic Acid | | 82 | | | 74 | |
| 21 | 30 ml $SO_2$ + Acetic Acid + Propionic Acid | | 40 | | | 2 | |

*The fatty acids were kept at room temperature.

Synergism Between $SO_2$ and Piperonyl Butoxide* or Ethyl Alcohol*

| | | % Kernels Showing Internal Mold | | | | | |
|---|---|---|---|---|---|---|---|
| | | Before Amb. Air Drying | | | After Amb. Air Drying | | |
| Example | Treatments/200 g Corn | Sample I | Sample II | Sample III | Sample I | Sample II | Sample III |
| 22 | 50 ml Air — P. Butoxide* | | 85 | | | 90 | |
| 23 | 25 ml $SO_2$ — P. Butoxide | | 4 | | | 2 | |
| 23A | 10 ml $SO_2$ — Ethyl Alcohol follow after 5 min. by 10 ml $NH_3$ | | 60 | | | 16 | |

*at room temperature

As seen from Table I, each of the esters tested in Examples 3–8 showed a marked improvement in the percent of kernels showing internal mold before ambient air drying. Since similar results to the air control were obtained when air was bubbled through the corresponding esters, a clear synergism between sulfur dioxide and the indicated esters is demonstrated in Table I. As seen from Table I, all of the test substances were superior to the $SO_2$ or air controls prior to drying (Examples 3–8). Only ethyl malonate exhibited a higher percentage of internal mold after ambient air drying, thus indicating that the other specified treatments may also be superior to $SO_2$ treatment even after ambient air drying. As seen from Examples 3, 4 and 7, good results were obtained with ethyl acetate, isopropyl acetate, and ethyl myristate. Excellent results were obtained with ethyl succinate after ambient air drying (Example 5).

Referring now to Table II, the synergism between lower aliphatic fatty acids and sulfur dioxide is clearly demonstrated. In Table II, data is presented for three separate samples before and after ambient air drying. In Examples 15–17 varying amounts of sulfur dioxide and propionic acid were tested which indicate that even with as little as 10 ml of sulfur dioxide, suitable results were obtained both before and after ambient air drying. When Examples 15–17 are compared to similar quantities of sulfur dioxide tested in Examples 11–13, it will be noted that in each instance the sulfur dioxide-propionic acid combination exhibited superior results over the results obtained for corresponding volumes of sulfur dioxide alone. Further, in Example 14, it may be seen that the bubbling of air through propionic acid did not produce results which differed significantly from the results obtained using air alone (Example 9).

Synergism is also demonstrated between sulfur dioxide and acetic acid (Example 19) and a combination of acetic and propionic acid and sulfur dioxide (Example 21) when compared with their corresponding controls, Examples 18 and 20 respectively. Examples 22 and 23 additionally show superior results when sulfur dioxide is bubbled through piperonyl butoxide, a known insecticidal agent.

At the present time, the mechanism(s) which produces the above-demonstrated synergism is not understood. Both the lower aliphatic fatty acids and esters have relatively low vapor pressures at room temperature. According to The Handbook of Chemistry and Physics, 46 ed., 1965–66, at pages D-105, D-106, and D-107, the following vapor pressures are reported for the following acids and esters: formic acid, 24° C., 40 mm; acetic acid, 17.5° C., 10 mm; propionic acid, 39.7° C., 10 mm; ethyl acetate, 9.1° C., 40 mm; isopropyl acetate, 17° C., 40 mm; diethyl succinate, 54.6° C., 1 mm. It is estimated that the gaseous fatty acids and esters were present in the mixture with sulfur dioxide in amounts of approximately 10–500 parts per million. Under the experimental conditions, there was no carry-over of any liquid fatty acid or ester, and as the controls demonstrate, the amount of improvement in antimicrobial effect can not be explained simply by the effect that the given vapor pressures of fatty acids may have directly upon the grain to be preserved. Normally, when lower aliphatic fatty acids, such as propionic acid are used, effective amounts required for grain preservation are applied in ranges of about 1%. It is theorized that the small amount of fatty acid or ester which is present in the sulfur dioxide treatment gas may in some way act as a catalyst or activation agent or synergist for increasing the penetration of sulfur dioxide into the grain to be treated, to in some way make the mold present in the grain more susceptible to sulfur dioxide attack, or to in some way accelerate the known antimicrobial actions of sulfur dioxide.

It has also been determined that by following the application of sulfur dioxide gas with gaseous ammonia additional advantages may be obtained. At the present time, it is preferred to incubate the sulfur dioxide treated grain for a period of time sufficient to permit sulfur dioxide penetration, and effect all primary reactions between the sulfur dioxide gas and its associated grain. Depending upon the incubation time selected, it may be desirable to distribute the sulfur dioxide gas by introducing a carrier gas, such as air or nitrogen, into the grain mass prior to the application of ammonia gas. In order to establish the efficacy of this treatment, samples of 200 g of corn containing about 25% moisture were placed in tin cans with provision for introducing gases from the bottom. First, each of the gases initially listed in Table III was injected into the can, whereupon the sample with this gas was permitted to incubate for about 1 minute. This gas was then dispersed by blowing in 10 times the amount air. A second gas was then introduced into the can, allowed to remain for 1 minute, and then dispersed as before. Following these treatments, the cans were connected to a room temperature ambient air supply having about a 40% to 50% relative humidity. Ambient air drying was continued for 4 days (except for Examples 30 and 31) and the corn analyzed for percent moisture and percent kernels with internal mold. The results are set forth in Table III:

TABLE III

Gas Treatment Followed by Ambient Air Drying at a Rate of 1-2 Cubic Feet per Minute Per Bushel and Low Relative Humidity

| Example | Treatment | Moisture Initial | Moisture Final | Drying Time Days | % Kernels with Internal Mold Initial | % Kernels with Internal Mold Final |
|---|---|---|---|---|---|---|
| 24 | Control | 24.5 | — | | 100 | MOLDY* in 3 days |
| 25 | 25 ml NH$_3$ + 25 ml SO$_2$ | 24.5 | 14.6 | 4 | 100 | 24 |
| 26 | 25 ml SO$_2$ + 25 ml NH$_3$ | 24.5 | 13.2 | 4 | 100 | 8 |
| 27 | 50 ml NH$_3$ + 50 ml SO$_2$ | 24.5 | 11.5 | 4 | 100 | 10 |
| 28 | 50 ml SO$_2$ + 50 ml NH$_3$ | 24.5 | 10.8 | 4 | 100 | 2 |
| 29 | 100 ml NH$_3$ | 24.5 | 10.6 | 4 | 100 | 100 |
| 30 | 50 ml SO$_2$ | 24.5 | 15.0 | 2 | 100 | 12 |
| 31 | 100 ml SO$_2$ | 24.5 | 15.2 | 2 | 100 | 8 |

*Visible moldy throughout corn

As seen from the control (air), a preservative is needed in order to prevent the grain from becoming moldy in 3 days. While each of Examples 25–31 exhibited some preservative effect, Examples 26 and 28 provided better final mold percents than those expected or obtained from corresponding volumes of either sulfur dioxide gas alone, or ammonia gas alone (see Examples 26–28). For example, 50 ml of sulfur dioxide gas achieved a final percent mold of 12, while a corresponding volume of sulfur dioxide gas followed by an application of ammonia gas achieved a final percent mold of 2, a value which was not equaled even when the quantity of sulfur dioxide gas was doubled (see Example 31). Accordingly, Table III clearly demonstrates that such treatments of sulfur dioxide gas followed by ammonia gas produce a product which is superior to those products obtained through treatments with corresponding amounts of either sulfur dioxide gas or ammonia gas.

In addition to the improved preservative effects demonstrated by the above-described treatments, it has been determined that the application of sulfur dioxide gas followed by ammonia gas creates a far less corrosive treatment environment and/or treated grain product. The corrosiveness of various treatments has been estimated by determining the percent change in the weights of metal pieces buried in corn subject to various treatments. When sulfur dioxide is applied first, and followed by at least volumetric equivalent amounts of ammonia gas, the percent corrosion was determined to be 0.07. This compares favorably to values of 0.27% obtained for sulfur dioxide treatments, 0.31% obtained for propionic acid treatments, 0.32% obtained for treatments with a 45% aqueous solution of ammonium bisulfite, 0.24% for an aqueous solution of 39% ammonium bisulfite + 17% propionic acid, and 0.19% obtained when ammonia gas was applied first then followed by corresponding volumes of sulfur dioxide. The preferred treatments of the present invention are, of course, more corrosive than applications of just ammonia gas or air, each of which produce negligible corrosion.

In the aforementioned test, ambient air drying was conducted using an air supply of about 40% to 50% relative humidity. By comparison, in the following examples, tests were conducted in relatively high humidities, to determine whether treatments of sulfur dioxide gas followed by ammonia gas would be adversely affected in such humidities. In these examples, 500 g of corn at approximately 25% moisture were placed in a chromatographic glass column (24 in. ×2 in. in diameter). About 400 ml of air were removed from the column and the gases were introduced into the column as indicated in Table IV. The gases were allowed to remain in the column for about 15 minutes and then the chromatographic column was connected to an ambient air supply. A flow regulator and wash bottles containing water or saturated potassium sulfate solutions were utilized to provide appropriate ambient air humidities. Air was continuously blown into the column for 4 weeks before the contents were analyzed for total microbial load and moisture. From Table IV it will be seen that each of the samples had initial microbial loads of $5 \times 10^6$. Of these samples, the two controls, Examples 32 and 33, become moldy in one week. The introduction of 500 ml of sulfur dioxide followed after 15 minutes by the introduction of 250 ml of ammonia gas (Example 36) compared favorably with the application of 750 ml sulfur dioxide (Examples 34 and 35). All samples indicated suitable moisture contents and microbial loads after 4 weeks. Once again, it will be seen that the present invention provides a treatment technique which permits the use of relative smaller quantities of sulfur dioxide followed by applications of ammonia gas, which produce a far less corrosive treatment than treatments with sulfur dioxide gas alone.

TABLE IV

Gas Treatment Followed by Ambient Air Drying With High Relative Humidity

| Example | Treatment | % Moisture Initial | % Moisture 4 weeks | Microbial Load Initial | Microbial Load 4 weeks |
|---|---|---|---|---|---|
| 32 | Control | 25 | — | $5 \times 10^6$ | Moldy in 1 wk |
| 33 | Control | 25 | — | $5 \times 10^6$ | Moldy in 1 wk |
| 34 | $SO_2$ (750 ml) | 25 | 12.5 | $5 \times 10^6$ | $<10^3$ |
| 35 | $SO_2$ (750 ml) | 25 | 15.3 | $5 \times 10^6$ | $<10^3$ |
| 36 | $SO_2 + NH_3$ 500 ml $SO_2$ followed (after 15 min) by 250 ml $NH_3$ | 25 | 13.2 | $5 \times 10^6$ | $<10^3$ |

In order to investigate the effect of various treatments on samples of wet corn (about 25% moisture) in a stationary, partially closed environment, 500 g samples of such corn were placed in one pound brown bottles fitted with a rubber stopper through which was inserted polyethylene tubing (⅛ in. ID by ¼ in. OD) long enough to reach the bottom of the bottle and to extend about 2 in. above the stopper. The tubing inside the bottle was pierced with several holes. The tubing outside the bottle was fitted with a clamp to permit the tubing to be opened or tightly clamped shut. About 400 ml of air was removed from each bottle and the tube clamped shut. Gases were then introduced into the tubing in the amounts and in the order shown in Table V. Unless otherwise indicated in Table V, the gases were introduced one after the other with no delay. The initial microbial load in each instance was $34 \times 10^7$ organisms per gram of corn. At the end of 1 week, 5 weeks and 12 weeks, the microbial load was determined to show the fungicial activity of the system tested. The moisture of the treated corn did not change appreciably from the initial levels during the entire course of the test. The results are shown in Table V:

to prevent the samples from becoming moldy within one week. Single applications of sulfur dioxide gas at levels of either 1000 ml (Example 49) or 750 ml (Example 41) are sufficient to produce microbial loads after 12 weeks of no more than $10^3$ (generally acceptable values). A substantial initial improvement in the activity of sulfur dioxide is shown by Example 42 where that sulfur dioxide is bubbled through formic acid. This data is consistent with the data reported in Table I. In Examples 45 and 46 (applications of 500 and 750 ml of sulfur dioxide followed after 2 days by treatments of 250 ml of ammonia gas), improvements were shown, particularly at the 1 and 5 week periods, over corresponding applications of just sulfur dioxide (Example 41). Due to the somewhat unusual sealed environment of these tests, it is believed that the test conditions represent a "worst case" condition. For example, since diffusion of sulfur dioxide gas occurs slowly under these conditions, additional lengths of time or additional amounts of sulfur dioxide are believed necessary in order to prevent the premature neutralization of the treated grain mass with subsequently introduced quantities of ammonia gas. These reasons may account for the fact that Examples 46 and 45 show superior results to those obtained with Example 47. In each instance, however, it will be noted that the introduction of sulfur dioxide gas followed by ammonia gas is superior to the reverse order of such gas introductions. (Compare Example 47 to 48).

As demonstrated from the above examples, it is considered to be advantageous in accordance with the preferred embodiments of the present invention to use volume proportions of sulfur dioxide to ammonia which are between 1:1 to 3:1. The total amount of gas employed should be from about 0.25 to about 3.0 liters of gas at standard conditions of temperature and pressure per kilogram of grain. Preferably, the amount of gas should be 0.5-2.5 liters per kilogram of grain, as optimum effects appear to be derived in this range.

Taste panel evaluations have been conducted on various grain products. The results indicated that samples first treated with sulfur dioxide followed by ammonia gas produced taste ratings which are better than either control or sulfur dioxide treated samples. In these tests, coded samples of corn were presented to a panel of 12 untrained judges who were asked to rank color, odor

TABLE V

Stationary Storage of Grain

| Example | Treatment per 500 g of Moist Corn | Microbial Load 1 Week | Microbial Load 5 Weeks | Microbial Load 12 Weeks |
|---|---|---|---|---|
| 37 | 250 ml $NH_3$ + 500 ml $SO_2$ (2 hrs. after $NH_3$ treatment) | $2 \times 10^6$ | Moldy after 2 wks. | — |
| 38 | 250 ml $NH_3$ + 750 ml $SO_2$ (2 hrs. after $NH_3$ treatment) | $4 \times 10^4$ | $3 \times 10^3$ | $5 \times 10^5$ |
| 39 | 500 ml $Cl_2$ + 500 ml $SO_2$ (2 hrs. after $Cl_2$ treatment) | $6 \times 10^3$ | $1 \times 10^3$ | $12 \times 10^3$ |
| 40 | 350 ml $Cl_2$ + 350 ml $SO_2$ 300 ml $NH_3$ | $1 \times 10^6$ | Moldy after 4 wks. | — |
| 41 | 750 ml $SO_2$ | $14 \times 10^4$ | $2 \times 10^4$ | $2 \times 10^3$ |
| 42 | 750 ml $SO_2$ Containing some formic acid vapor. ($SO_2$ bubbled through formic acid) | $5 \times 10^3$ | $2 \times 10^3$ | $1 \times 10^4$ |
| 43 | 750 ml $SO_2$ + 250 ml $N_2$ | $8 \times 10^3$ | $3 \times 10^4$ | $7 \times 10^4$ |
| 44 | 750 ml $SO_2$ + 250 ml $CO_2$ | $12 \times 10^3$ | $2 \times 10^3$ | $4 \times 10^3$ |
| 45 | 500 ml $SO_2$ + 250 ml $NH_3$ (2 days after $SO_2$ treatment) | $9 \times 10^3$ | $2 \times 10^3$ | $3 \times 10^3$ |
| 46 | 750 ml $SO_2$ + 250 ml $NH_3$ (2 days after $SO_2$ treatment) | $9 \times 10^4$ | $2 \times 10^3$ | $2 \times 10^3$ |
| 47 | 500 ml $SO_2$ + 500 ml $NH_3$ (2 hrs after $SO_2$ treatment) | $9 \times 10^4$ | Moldy | — |
| 48 | 500 ml $NH_3$ + 500 ml $SO_2$ (2 hrs after $NH_3$ treatment) | $43 \times 10^4$ | Moldy | — |
| 49 | 1000 ml $SO_2$ | $11 \times 10^3$ | $2 \times 10^3$ | $<10^3$ |
| 50 | 1000 ml $NH_3$ | Moldy | — | — |
| 51 | Control | Moldy (in 2 days) | — | — |

As seen from Examples 51 (control-air) and 50 (1000 ml ammonia $NH_3$), a preservative is necessary in order and taste on a scale of 1-10, with 1 being the best. Odor and taste were evaluated on cooked samples. Averaging the rankings by the judges, control samples were evaluated for color at 5.5, odor at 5.0, and taste at 4.0. Sulfur dioxide treated samples were evaluated for color at 3.5, odor at 4.6, and taste at 4.4. Sulfur dioxide plus ammonia treated samples were evaluated for color at 3.3, odor at 3.8, and taste at 1.8. These results, and the evaluations of corn treated through the above-described tests, indicate that corn treated in accordance with the preferred embodiments of the present invention should be suitable for human consumption. These results may be compared with the data set forth in Table V of applicants' above-referenced related patent application entitled "Liquid Anti-Microbial Treatments For Storage Grain".

As explained above, treatments with sulfur dioxide followed by ammonia gas are believed to produce novel preserved grain products. Grain treated in this manner is estimated to contain slightly elevated ammonia and sulfur contents. In order to investigate the mechanism of sulfur dioxide and ammonia gas activity on corn treated therewith, an experiment was conducted utilizing 200 g of re-hydrated corn having a 25% moisture content. This corn was transferred to a glass column which was connected to a tube at the top passing through known amounts of iodine solution or sulfuric acid solution. Fifty ml of sulfur dioxide were injected at the bottom of the column and slowly flushed with 500 ml of air. The gases coming out of the top of column were allowed to bubble through 0.1 N iodine solution. The amount of iodine used by any sulfur dioxide coming out of the top of the column was back titrated. After the sulfur dioxide flushing, 50 ml of ammonia gas were injected at the bottom of the column and flushed with 500 ml of air as before. The gases coming out the top were also allowed to bubble through a known amount of 0.1 N $H_2SO_4$. By back titrating the $H_2SO_4$, the amount of ammonia gas coming out, if any, at the top of the column was calculated. Results indicated that extremely small (i.e. negligible) amounts of either $SO_2$ or $NH_3$ came out of the top of the column. These results confirm the fact that upon application, sulfur dioxide complexes with the treated grain, and the resultant complex subsequently combines with ammonia gas applied thereto.

The ammonia content of grain treated in accordance with the present invention is estimated to be elevated over untreated corn by approximately 6 to 18 mg of ammonia per 100 g of grain. The range of sulfur derivatives likely to be formed through the addition of sulfur dioxide gas is quite broad. Accordingly, total sulfur determinations after Parr Bomb combustion have been made. In accordance with this method, the organic material is decomposed by sodium peroxide, and the sulfur present is at the same time oxidized to its sulfate ion. Sulfate is then subsequently determined gravimetrically as barium sulfate. Analyses of the resultant preserved grain have been made on samples taken from three different positions in bins of grain which were treated with sulfur dioxide followed by ammonia. The treated samples indicated sulfur contents in the range of 230-245 mg per 100 g of grain, whereas untreated controls indicated 150 to 170 mg per 100 g of grain. Accordingly, it has been estimated that treatments in accordance with the present invention increase the sulfur content of treated grain by between about 50 and 100 mg per 100 g of grain, averaging an amount of about 71 mg per 100 g of treated grain. These experimentally determined amounts are comparable to experimentally determined amounts of sulfur in samples treated with corresponding amounts of sulfur dioxide only.

As seen from the above, simple, reliable and low cost treatments are provided for treating grains to prevent microbial spoilage. In the above examples, grains naturally containing bacteria, molds, yeasts, spores, etc. were utilized to simulate actual storage conditions. The effect of the preferred embodiment treatments on various types of microorganisms has also been investigated. In Table VI and VII set forth hereinafter, total plate counts of organisms set forth in number of organisms per gram of corn have been determined, showing that when the subject corn was treated with preferred amounts of sulfur dioxide followed by ammonia gas, many different species of organisms were in fact affected by the subject treatments.

TABLE VI

| Total Plate Counts | (# Microorganisms per g of Corn) | |
|---|---|---|
| Organisms | Before Treatment | After Treatment |
| Bacteria | $4.3 \times 10^7$ | $<8 \times 10^3$ |
| Cladosporium spp. | $3.2 \times 10^5$ | $<2 \times 10^3$ |
| Cephalosporium acremonium | $8 \times 10^5$ | $<2 \times 10^3$ |
| Fusarium moniliforme | $3 \times 10^3$ | $<2 \times 10^3$ |
| Yeasts | $2.1 \times 10^4$ | $<2 \times 10^3$ |
| Aspergillus flavus* | $3.8 \times 10^8$ | $<2 \times 10^3$ |

*On infected wheat.

TABLE VII

| % Internal Mold | | After |
|---|---|---|
| Organism* | Before Treatment | Treatment |
| Epicoccum | 54 | 0 |
| Alternaria | 80 | 0 |
| Nigrospora | 10 | 0 |
| Cephalosporium acremonium | 4 | 0 |
| Fusarium moniliforme | 8 | 0 |
| Yeast | 14 | 0 |

*Determined by whole kernel plating of samples after surface sterilization.

From the above, it will be seen that the methods of the present invention are extremely effective in providing simple, low cost treatments for storage grains, such as corn, wheat, and sorghum. Due to their wide range antimicrobial activity, these methods are expected to be similarly effective on harvests of moist peanuts and sunflower seeds. In peanuts, infections with A. flavus are known to be a problem leading to the formation of aflatoxin. The above indicated A. flavus results indicate that treatments in accordance with the present invention will be particularly useful to the peanut industry.

As mentioned above, the amount of fatty acid, ester or alcohol which is introduced into the sulfur dioxide gas stream may be varied by varying the temperature of a bath through which sulfur dioxide is passed. By way of example, in Table VIII, various vapor pressures are estimated for propionic acid at different temperatures.

TABLE VIII

| Temperature °C. | Calculated Vapor Pressure in mm | Amount of Propionic Acid in ppm* |
|---|---|---|
| 35 | 7.78 | 22 |
| 45 | 13.71 | 37 |
| 55 | 23.07 | 45 |
| 60 | 30.0 | 59 |

TABLE VIII-continued

| Temperature °C. | Calculated Vapor Pressure in mm | Amount of Propionic Acid in ppm* |
|---|---|---|
| 70 | 48.87 | 74 |

*According to the formula $$\log_{10} = -\frac{0.05223 \times a}{T} + b$$

where $a = 46,150$
$b = 8.715$ for propionic acid

As seen from Table VIII, by increasing the temperature of a propionic acid bath by 35° C. to 70° C., the amount of propionic acid in parts per million introduced into the sulfur dioxide gas stream will more than triple. Thus, by adjusting the temperature of the liquid bath through which sulfur dioxide is passed, appropriate vapor amounts may be selected for introduction into this gas stream.

While specific experimental techniques have been described throughout this application for perfusing grain with various amounts of the indicated gases, one of ordinary skill in this art will recognize that the application of such gases to larger quantities of grain may require care to be taken to insure substantially uniform dispersion of the indicated gas or gases throughout the grain mass. Accordingly, in addition to the introduction of a carrier gas, it may be desirable to insert perforated or solid tubings through the grain mass to serve as gas conduits, to apply heavier-than-air gases, such as sulfur dioxide, from the top of the grain mass, lighter-than-air gases from the bottom of the grain mass and/or to introduce the given materials in the form of liquids which are permited to vaporize at room temperature to provide the indicated gaseous treatments.

What is claimed is:

1. A method of treating moist grain to produce a preserved grain end product comprising contacting said grain with effective amounts of sulfur dioxide and a lower aliphatic fatty acid vapor to produce a preserved grain product wherein the amount of said vapor is sufficient to enhance the antimicrobial actions of said sulfur dioxide.

2. The method of claim 1 wherein said vapor is a vapor of propionic acid.

3. The method of claim 1 wherein said vapor is a vapor of acetic acid.

4. The method of claim 1 wherein said vapor is a vapor of formic acid.

5. The method of claim 1 wherein said vapor and said sulfur dioxide are simultaneously applied to said grain.

* * * * *